Feb. 10, 1925.

O. HUNGER ET AL

ALARM

Filed June 28, 1920      4 Sheets-Sheet 1

Inventors:
Oswald Hunger
Wilhelm Egon Joryn

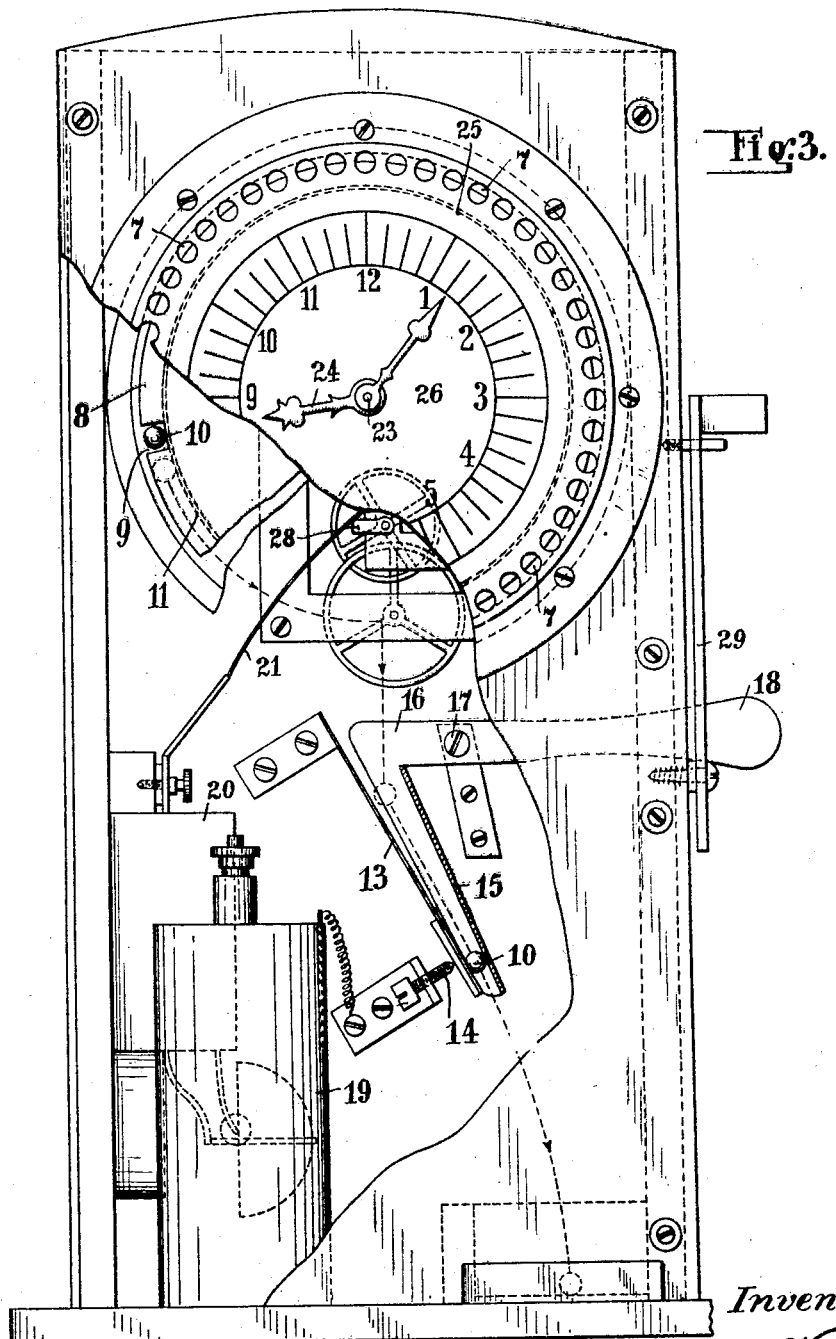

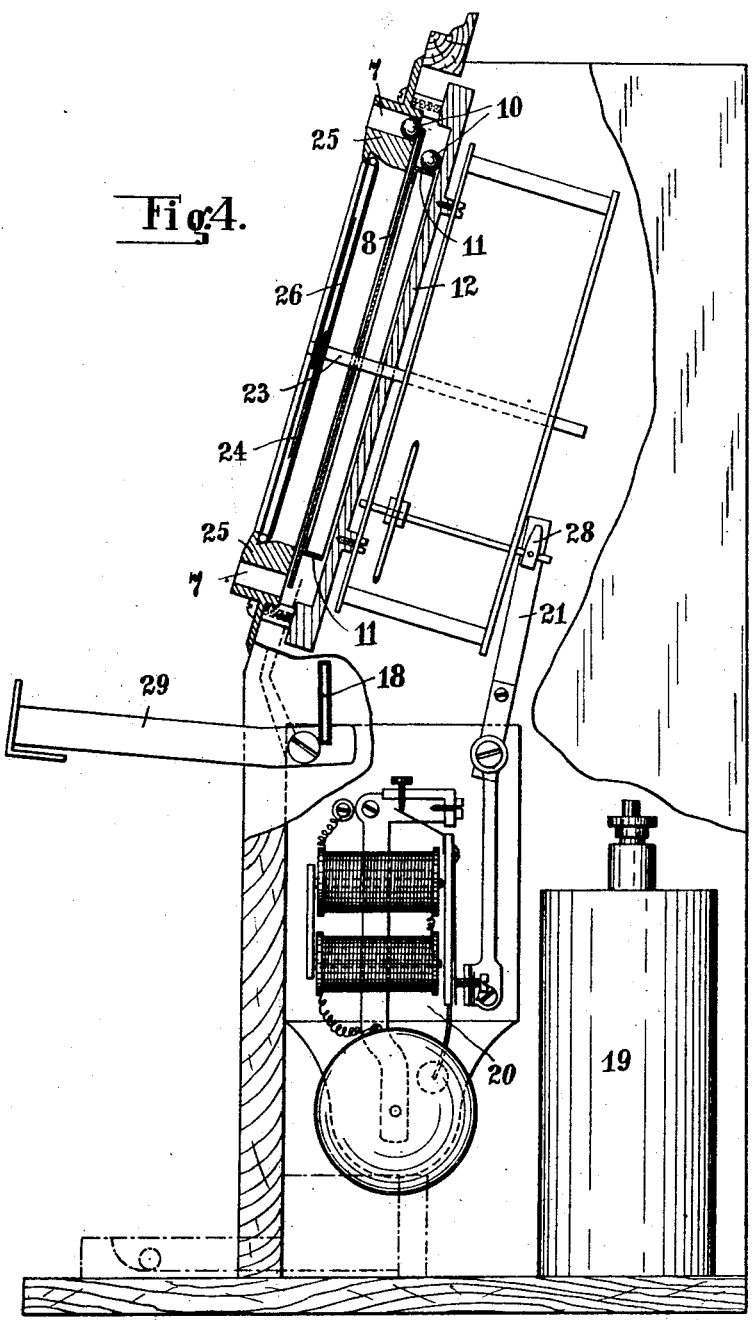

Feb. 10, 1925.
O. HUNGER ET AL
1,526,214
ALARM
Filed June 28, 1920  4 Sheets-Sheet 4
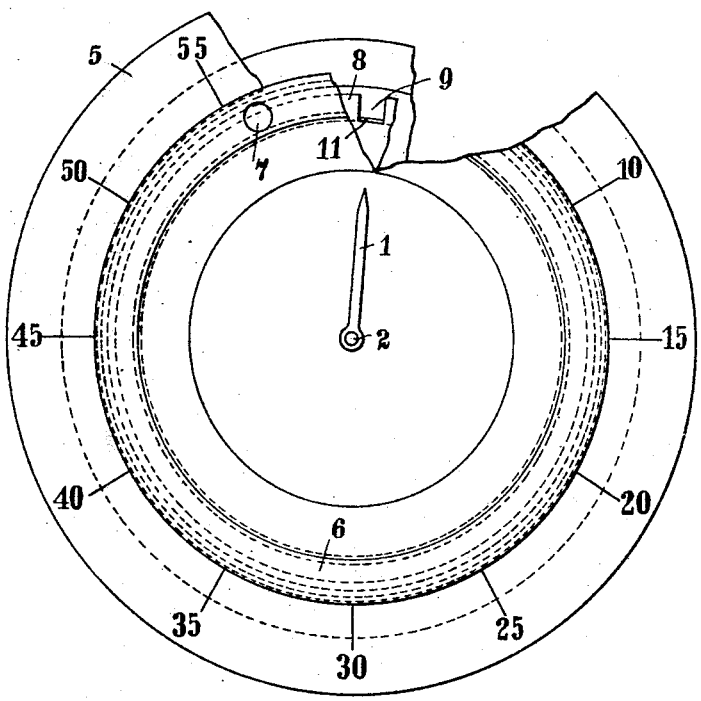
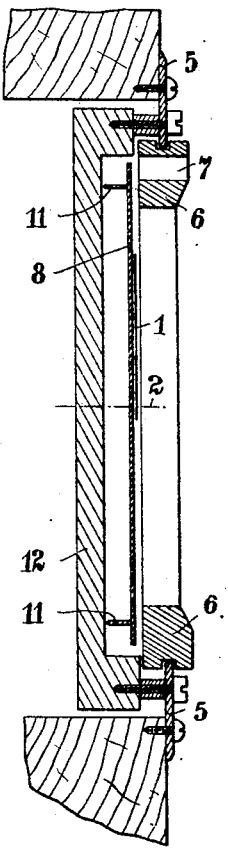
Inventors:
Oswald Hunger Patented Feb. 10, 1925.

1,526,214

UNITED STATES PATENT OFFICE.

OSWALD HUNGER AND WILHELM ESPENHAYN, OF CHEMNITZ, GERMANY, ASSIGNORS TO THE FIRM: HUNGER & UHLIG, OF CHEMNITZ, GERMANY.

ALARM.

Application filed June 28, 1920. Serial No. 392,423.

*To all whom it may concern:*

Be it known that we, OSWALD HUNGER and WILHELM ESPENHAYN, citizens of the German Empire, residing at Chemnitz, Germany, have invented certain new and useful Improvements in Alarms, of which the following is a specification.

Our invention refers to alarms and more especially to a device to be applied to indicating and measuring instruments of all kinds such as counters, manometers, clocks and the like and which can be set to any predetermined time or number of revolutions or to any predetermined pressure, as the case may be, a signal or sequence of signals being produced as soon and whenever the predetermined point or time is reached or exceeded.

In the drawings affixed to this specification and forming part thereof our invention is shown as applied by way of example to a counter, a clock and a manometer. In the drawings—

Figs. 1 and 2 illustrate the counter, Fig. 1 being a front elevation with part of the front wall broken away, while Fig. 2 is a vertical section taken at right angles to Fig. 1.

Figs. 3 and 4 are similar views of a clock, embodying the invention, and

Figs. 5 and 6 represent a manometer in a similar manner.

Figure 2:
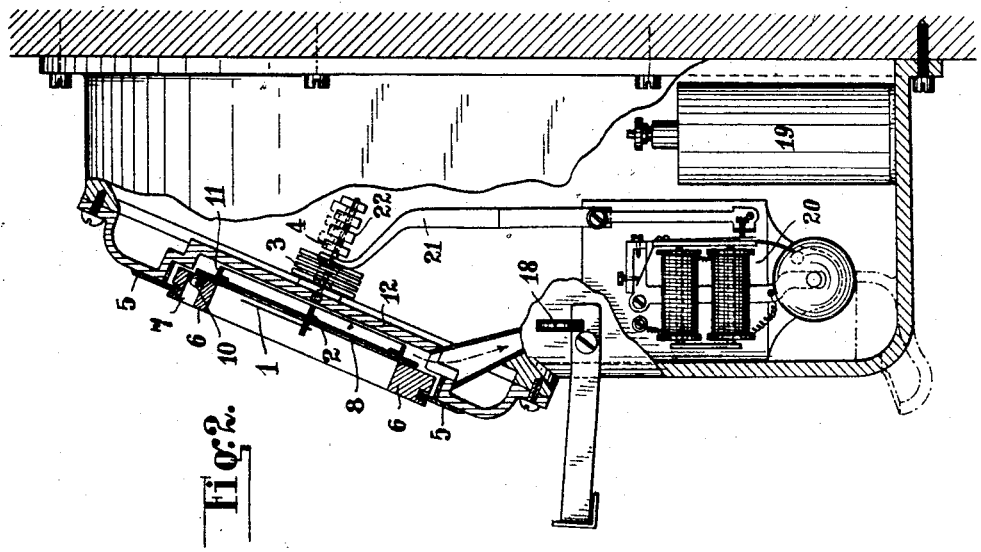
Figure 1:
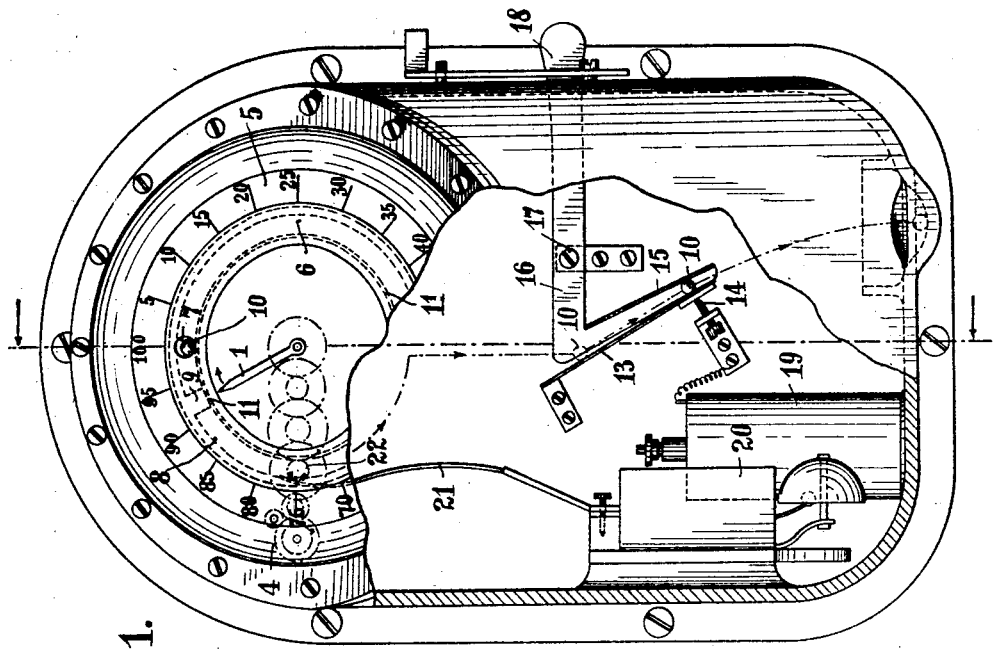

Referring to Figs. 1 and 2 of the drawings, 1 is the pointer of the counter, said pointer being fixed to the main spindle 2, and 3, 4 are some of the disks or wheels fixed to the said spindle or in gear therewith. 5 is a scale disposed around the pointer. Between the scale and the pointer a ring 6 is disposed which can be rotated freely by hand and has a boring or pocket 7 arranged therein which can be carried below any of the figures of the said scale by simply turning the ring. On the spindle 2 there is further fixed a disk 8 whose diameter about equals the diameter of ring 6 and which follows the pointer in its rotation. An indenture 9 is provided near the circumference of disk 8 below the pointer 1 and at a distance from the spindle about equal to the diameter of the ring 6. Assuming for instance a metal ball to be inserted in the boring or pocket 7, this ball, as soon as the pointer 1 and the indenture 9 of disk 8 will have reached the pocket 7, will be free to pass through the said indenture and to fall behind disk 8, there to actuate an alarm of some sort, while up till then it was prevented from leaving the pocket by the solid portion of disk 8.

At the rear of disk 8 a ring 11 and a back 12 form a ball race between them serving to lead the ball escaping from the pocket on to a contact plate 13 having its free end disposed in close proximity to a threaded contact pin 14. Close to plate 13 there is arranged the channeled arm 15 of a hook shaped lever 16 pivoted to the casing at 17 and projecting through its wall at 18. The contact pin 14 is inserted in the circuit of a dry cell 19 together with an electric alarm 20 and a contact spring 21 contacting with one of the wheels 22 of the counter rotating at a higher speed.

If it be desired for instance to have the alarm operated as soon as the pointer is about to pass underneath the figure 100 on the scale, then ring 6 is rotated by hand so as to carry its pocket 7 underneath that figure, and a metal ball is placed in the pocket (Fig. 1). As soon, now, as pointer 1 has reached the figure 100, the indenture 9 of disk 8 will coincide with the pocket 7. The ball 10 being now free to leave the pocket will pass through the indenture 9 on to the ring 11 and on falling through the channel formed by ring 11 and rear wall 12 will be caught between the resilient contact plate 13 and arm 15 of the lever 16, the distance between these two parts being less than the diameter of the ball. The weight of the ball causes a contact to be established between plate 13 and pin 14, whereby the alarm circuit is closed and the alarm is operated, until lever 16 is raised by its projecting end 18, whereby arm 15 is lifted free of plate 13 and ball 10 being released falls off. The spring contact 21 connected with the alarm 20 serves to render the signalling intermittent in order to prevent the dry cell from being quickly exhausted. To this end the wheel 22 may carry a contact segment which causes a contact with the spring 21 to be established and the alarm circuit to be closed only for a short time, so that a short signal will be produced at each revolution of wheel 22 until lever 16 has been oscillated by hand and has released the metal ball.

In the clock illustrated in Figs. 3 and 4 the signalling device according to the present invention is applied with certain modifications. Here the disk 8 provided with the indenture 9 is fixed to the spindle 23 of the hour hand 24 and the indenture 9 is disposed underneath the pointer thereof. The rotatable ring 6 is here replaced by a stationary ring 25 encircling the dial 26 and having a number of pockets 7 formed therein. The contact spring 21 contacts with an arm 28 fixed to the spindle of the minute wheel so that here the alarm circuit is closed only for a short time, the contact being reestablished only after a minute has lapsed, until lever 16 is actuated. By placing a ball in say each fourth pocket the alarm may be actuated for instance at the predetermined hour and at each full hour succeeding it.

By lowering the lever 29, arm 15 may be permanently lifted off plate 13, whereby the balls which may have been inserted in the pockets will fall through without actuating the alarm.

In the manometer shown in Figs. 5 and 6 the indenture 9 of disk 8 is again arranged on the spindle of the pointer. The attaining of a predetermined pressure is indicated and made audible by setting the pocket 7 of the movable ring 6 on this very pressure.

We wish it to be understood that we do not desire to be limited to the exact details of construction shown and described, for obvious modifications will occur to a person skilled in the art. Thus for instance the electric alarm here shown might be replaced by some other suitable kind of alarm or by an optical signalling device.

We claim:

1. In a device of the kind described in combination, a rotary disc with an eccentrically arranged indenture, a ring in front of said disc with a hole spaced about the same distance from the axis of rotation as said indenture and an alarm mechanism underneath said disc capable of being actuated by a body inserted in said hole and resting against said disc, but tumbling through said indenture when this latter passes behind said hole.

2. In a device of the kind described in combination, a rotary disc with an eccentrically arranged indenture, a pointer connected with said disc and extending coradially with said indenture, a ring in front of said disc with a hole spaced about the same distance from the axis of rotation as said indenture and an alarm mechanism underneath said disc capable of being actuated by a body inserted in said hole and resting against said disc, but tumbling through said indenture when this latter passes behind said hole.

3. In a device of the kind described in combination, a rotary disc with an eccentrically arranged indenture, a pointer connected with said disc and extending coradially with said indenture, a ring, comprising a scale in front of said disc with a hole spaced about the same distance from the axis of rotation as said indenture and an alarm mechanism underneath said disc capable of being actuated by a body inserted in said hole and resting against said disc, but tumbling through said indenture when this latter passes behind said hole.

4. In a clock in combination, an hour spindle, a pointer and a disc on said spindle with an eccentrically arranged indenture, a dial in front of said disc, a ring around said dial with a hole spaced about the same distance from the axis of said spindle as said indenture and an alarm mechanism underneath said disc capable of being actuated by a body inserted in said hole and resting against said disc, but tumbling through said indenture when this latter passes behind said hole.

5. In a device of the kind described in combination, a rotary disc with an eccentrically arranged indenture, a ring in front of said disc with a hole spaced about the same distance from the axis of rotation as said indenture, an electric alarm mechanism underneath said disc and a channel behind said disc and extending towards said alarm, said alarm being capable of being actuated by a body inserted in said hole and resting against said disc, but tumbling through said indenture when this latter passes behind said hole.

6. In a clock in combination, an hour spindle, a pointer and a disc on said spindle with an eccentrically arranged indenture, a dial in front of said disc, a ring around said dial with a hole spaced about the same distance from the axis of said spindle as said indenture, an electric alarm mechanism underneath said disc, a channel behind said disc and a contact associated with said channel and adapted to be closed by a body inserted in said hole and resting against said disc, but tumbling through said indenture into said channel, as said indenture passes behind said hole.

7. In a clock in combination, an hour spindle, a pointer and a disc on said spindle with an eccentrically arranged indenture, a dial in front of said disc, a ring around said dial with a hole spaced about the same distance from the axis of said spindle as said indenture an alarm mechanism underneath said disc capable of being actuated by a body inserted in said hole and resting against said disc, but tumbling through said indenture when this latter passes behind said hole, and means inserted in the alarm circuit and adapted to be actuated by a rotary member for intermittently throwing said alarm in and out.

In testimony whereof we affix our signatures.

OSWALD HUNGER.
WILHELM ESPENHAYN.